United States Patent
Melnikov (10) Patent No.: US 9,898,448 B2
(45) Date of Patent: Feb. 20, 2018

(54) METHOD FOR TEXT PROCESSING

(71) Applicant: YANDEX EUROPE AG, Lucerne (CH)

(72) Inventor: Ilia Alekseevich Melnikov, Reutov (RU)

(73) Assignee: YANDEX EUROPE AG, Luzern (CH)

( * ) Notice: Subject to any disclaimer, the term of this patent is extended or adjusted under 35 U.S.C. 154(b) by 0 days.

(21) Appl. No.: 14/921,189

(22) Filed: Oct. 23, 2015

(65) Prior Publication Data

US 2016/0232142 A1  Aug. 11, 2016

Related U.S. Application Data

(63) Continuation of application No. PCT/IB2014/066336, filed on Nov. 25, 2014.

(30) Foreign Application Priority Data

Aug. 29, 2014  (RU) ................. 2014135303

(51) Int. Cl.
*G06F 17/27* (2006.01)
*G06F 17/22* (2006.01)
*G10L 13/08* (2013.01)

(52) U.S. Cl.
CPC ........ *G06F 17/2264* (2013.01); *G06F 17/274* (2013.01); *G06F 17/2785* (2013.01); *G10L 13/08* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/2795
USPC .................................. 704/1, 9, 10
See application file for complete search history.

(56) References Cited

U.S. PATENT DOCUMENTS

| 4,916,614 | A | 4/1990 | Kaji et al. |
| 5,555,343 | A | 9/1996 | Luther |
| 5,634,084 | A | 5/1997 | Malsheen et al. |
| 6,345,243 | B1 * | 2/2002 | Clark ............... G06F 17/2836 704/2 |

(Continued)

FOREIGN PATENT DOCUMENTS

EA  016427 B1  4/2012

OTHER PUBLICATIONS

International Search Report from PCT/IB2014/066336; Lee W. Young; dated Apr. 1, 2015.

*Primary Examiner* — Lamont Spooner
(74) *Attorney, Agent, or Firm* — BCF LLP (57) ABSTRACT

Method for text processing executable at a computing device, comprising appreciating a source phrase comprised of source words; appreciating a target phrase comprised of target words; associating a respective source word feature set with each one of the source words; associating a respective target word feature set with each one of the target words; analyzing source word feature sets and target word feature sets; and based on the analysis, generating one or more phrase transformation rules for transforming the source phrase into the target phrase. Also a server and non-transitory computer-readable medium storing program instructions for carrying out the method.

14 Claims, 7 Drawing Sheets

(56) References Cited

U.S. PATENT DOCUMENTS

| | | | |
|---|---|---|---|
| 6,424,983 B1* | 7/2002 | Schabes | G06F 17/273 704/9 |
| 6,996,529 B1* | 2/2006 | Minnis | G10L 13/10 704/258 |
| 7,167,825 B1* | 1/2007 | Potter | H04L 9/065 380/42 |
| 7,689,405 B2* | 3/2010 | Marcu | G06F 17/2735 704/2 |
| 8,201,156 B1* | 6/2012 | Pohorsky | G06F 9/4448 704/1 |
| 8,798,986 B2 | 8/2014 | Clemons et al. | |
| 8,935,150 B2* | 1/2015 | Christ | G06F 17/276 704/2 |
| 9,245,253 B2* | 1/2016 | Markman | G06F 17/274 |
| 2002/0107683 A1* | 8/2002 | Eisele | G06F 17/2827 704/2 |
| 2002/0111789 A1 | 8/2002 | Hull | |
| 2002/0120451 A1* | 8/2002 | Kato | G10L 15/1822 704/258 |
| 2002/0173961 A1* | 11/2002 | Guerra | G10L 13/08 704/258 |
| 2003/0212541 A1* | 11/2003 | Kinder | G06F 17/27 704/4 |
| 2004/0215461 A1 | 10/2004 | Whikehart | |
| 2005/0267757 A1 | 12/2005 | Iso-Sipila et al. | |
| 2006/0004560 A1* | 1/2006 | Whitelock | G06F 17/2827 704/2 |
| 2008/0249760 A1* | 10/2008 | Marcu | G06F 17/289 704/2 |
| 2009/0248422 A1* | 10/2009 | Li | G06F 17/2827 704/277 |
| 2009/0326938 A1* | 12/2009 | Marila | G10L 15/22 704/235 |
| 2010/0057438 A1* | 3/2010 | Zhanyi | G06F 17/2827 704/4 |
| 2010/0145676 A1* | 6/2010 | Rogers | G06F 17/30905 704/9 |
| 2010/0198821 A1 | 8/2010 | Loritz et al. | |
| 2010/0223047 A1* | 9/2010 | Christ | G06F 17/2836 704/4 |
| 2010/0286979 A1* | 11/2010 | Zangvil | G06F 17/273 704/9 |
| 2011/0093254 A1* | 4/2011 | Kuhn | G06F 17/2827 704/2 |
| 2011/0184718 A1* | 7/2011 | Chen | G06F 17/2872 704/2 |
| 2011/0202344 A1* | 8/2011 | Meyer | G10L 13/04 704/260 |
| 2011/0202345 A1* | 8/2011 | Meyer | G10L 13/033 704/260 |
| 2011/0202346 A1* | 8/2011 | Meyer | G10L 13/02 704/260 |
| 2012/0253793 A1* | 10/2012 | Ghannam | G06F 17/2785 704/9 |
| 2013/0006613 A1* | 1/2013 | Karov Zangvil | G06F 3/0237 704/9 |
| 2013/0030787 A1 | 1/2013 | Cancedda et al. | |
| 2013/0173255 A1 | 7/2013 | Ehsani et al. | |
| 2013/0173258 A1* | 7/2013 | Liu | G06F 17/2217 704/9 |
| 2014/0379329 A1* | 12/2014 | Dong | G06F 17/2775 704/9 |
| 2015/0057996 A1* | 2/2015 | Koinuma | G06F 17/2223 704/9 |
| 2015/0194149 A1* | 7/2015 | Faizakof | G10L 15/1815 704/257 |
| 2015/0286632 A1* | 10/2015 | Meunier | G06F 17/2854 704/2 |
| 2015/0293902 A1* | 10/2015 | Bredikhin | G10L 13/08 704/9 |

* cited by examiner

METHOD FOR TEXT PROCESSING

CROSS-REFERENCE

The present application claims priority to Russian Patent Application No. 2014135303, filed Aug. 29, 2014, entitled "METHOD FOR TEXT PROCESSING" and is a continuation of PCT/IB2014/066336 filed on Nov. 25, 2014, entitled "METHOD FOR TEXT PROCESSING" the entirety of which are incorporated herein.

FIELD

The present technology relates to computer-implemented methods for text processing.

BACKGROUND

Text-to-speech conversion technologies take text phrases as input and generate audio phrases—audio data encoding spoken audio representative of the text phrases—which can then be "read aloud" via an audio interface of an electronic device.

Conventionally, the text phrases to be read aloud in this manner are converted into audio phrases on a word-for-word basis, such that each text word in a text phrase is converted into an audio word, and the audio words are assembled in the same order as their corresponding text words appear in the text phrase. The composition of the audio phrase and the composition of the text phrase therefore match word for word. For example, the text phrase "There are 2000 jelly beans in the jar" may be converted into an audio phrase which would be pronounced "There are two thousand jelly beans in the jar."

In some cases, however, the context of a text phrase is such that an audio phrase generated on a word-for-word basis may sound unnatural when read aloud. As a simple example, the text phrase "The Tate Modern opened in 2000" may be converted into an audio phrase which would be pronounced "The Tate Modern opened in two thousand," when an English speaker would more naturally have said "The Tate Modern opened in the year two thousand." Thus, in some cases, conventional word-for-word conversion of text phrases results in unnatural-sounding audio phrases, and it may be desirable to modify text phrases in order to facilitate subsequent text-to-speech conversion in some contexts.

There is therefore a need for improved methods for text processing.

SUMMARY

The present technology provides computer-implemented methods for generating one or more phrase transformation rules which can then be applied to a text phrase to generate a transformed text phrase. The phrase transformation rules may be generated by analyzing features of the words in a source phrase and features of the words in a target phrase to determine a mapping of the words in the source phrase to words in the target phrase.

One potential application of such methods is to generate phrase transformation rules which preprocess text phrases into transformed text phrases which may then be converted into audio phrases using conventional word-by-word text-to-speech conversion technologies. For example, the one or more phrase transformation rules may be applied to the text phrase "The Tate Modern opened in 2000" to transform it into "The Tate Modern opened in the year two thousand." Text-to-speech conversion of the transformed phrase may then result in a natural-sounding audio phrase.

Another potential application of such methods is to generate phrase transformation rules for reducing the length of phrases while retaining their basic essence. For example, such rules may be used on the phrase "The proud eagle sailed high in the sky" to reduce it to "The bird flew in the sky." By repeating this process on the phrases of a document, a summary of the document may be generated automatically.

As those skilled in the art will appreciate, the above-described potential applications are just two among many.

Thus, in one aspect, various implementations of the present technology provide a method for text processing, the method being executable at a computing device, the method comprising:

appreciating a source phrase comprised of source words;
    appreciating a target phrase comprised of target words;
    associating a respective source word feature set with each one of the source words;
    associating a respective target word feature set with each one of the target words;
    analyzing the source word feature sets and the target word feature sets to determine a mapping from the source words to the target words; and
    based on the mapping, generating one or more phrase transformation rules applicable to the source phrase to transform the source phrase into the target phrase.

In some implementations, analyzing the source word feature sets and the target word feature sets to determine a mapping from the source words to the target words comprises determining a similarity of each one of the source word feature sets to each one of the target word feature sets.

In some implementations, each one of the source word feature sets includes one or more grammatical features of the source word with which that source word feature set is associated; each one of the target word feature sets includes one or more grammatical features of the target word with which that target word feature set is associated; and determining the similarity of each one of the source word feature sets to each one of the target word feature sets comprises comparing the respective grammatical features of each one of the source words to the respective grammatical features of each one of the target words In some implementations, each one of the source word feature sets includes a meaning of the source word with which that source word feature set is associated; each one of the target word feature sets includes a meaning of the target word with which that target word feature set is associated; and determining the similarity of each one of the source word feature sets to each one of the target word feature sets comprises determining a similarity of the respective meaning of each one of the source words to the respective meaning of each one of the target words.

In some implementations, analyzing the source word feature sets and the target word feature sets to determine a mapping from the source words to the target words further comprises selecting a most similar one of the target word feature sets to one of the source word feature sets; and generating the one or more phrase transformation rules applicable to the source phrase to transform the source phrase into the target phrase comprises generating a first phrase transformation rule applicable to the source phrase to transform a source word associated with the one of the source word feature sets into a target word associated with the most similar one of the target word feature sets.

In some cases, the transformation rule may transform a form of a word without transforming its root. Thus, in some implementations, the source word associated with the one of the source word feature sets and the target word associated with the most similar one of the target word feature sets share a same root; and the first phrase transformation rule is applicable to the source phrase to modify a form of the source word to a form of the target word.

In some implementations, generating the one or more phrase transformation rules applicable to the source phrase to transform the source phrase into the target phrase comprises generating a second phrase transformation rule applicable to the source phrase to delete at least one word from the source phrase.

In some implementations, generating the one or more phrase transformation rules applicable to the source phrase to transform the source phrase into the target phrase comprises generating a third phrase transformation rule applicable to the source phrase to add at least one word to the source phrase.

In some implementations, the one or more phrase transformation rules having been generated are then also applied to a text phase to generate a transformed text phrase. Thus, in some implementations, the method further comprises appreciating a text phrase; and applying the one or more phrase transformation rules to the text phrase to generate a transformed text phrase. The text phrase may be identical to the source phrase, or it may be different from but sufficiently similar to the source phrase for the phrase transformation rule to be applied. Thus, in some implementations, the text phrase differs from the source phrase, and the method further comprises, before applying the one or more phrase transformation rules to the text phrase, determining that a similarity of the text phrase to the source phrase is greater than a threshold.

Some implementations of the present technology merely apply one ore more phrase transformation rules having been previously generated (e.g. by another computing device). Thus, in another aspect, various implementations of the present technology provide a method for text processing, the method being executable at a computing device comprising a memory, the memory storing one or more phrase transformation rules having been generated based on an analysis of feature sets including a source word feature set associated with a source word of a source phrase and a target word feature set associated with a target word of a target phrase, the method comprising:

appreciating a text phrase;
determining that a similarity of the text phrase to the source phrase is greater than a threshold; and
applying the one or more phrase transformation rules to the text phrase to generate a transformed text phrase.

The similarity of the text phrase to the source phrase may be assessed on the basis of a grammatical and/or semantic analysis. Thus, in some implementations of any one of the above aspects, determining that the similarity of the text phrase to the source phrase is greater than the threshold comprises performing at least one of a grammatical analysis and a semantic analysis of the text phrase and the source phrase.

In another aspect, various implementations of the present technology provide a non-transitory computer-readable medium storing program instructions executable by one or more processors of one or more electronic devices to carry out one or more of the above-recited methods. Thus, various implementations provide a non-transitory computer-readable medium storing program instructions for text processing, the program instructions being executable by a computing device to effect:

appreciation of a source phrase comprised of source words;
appreciation of a target phrase comprised of target words;
association of a respective source word feature set with each one of the source words;
association of a respective target word feature set with each one of the target words;
analysis of the source word feature sets and the target word feature sets to determine a mapping from the source words to the target words; and
based on the mapping, generation of one or more phrase transformation rules applicable to the source phrase to transform the source phrase into the target phrase.

In another aspect, various implementations of the present technology provide a non-transitory computer-readable medium storing one or more phrase transformation rules and program instructions, the one or more phrase transformation rules having been generated based on an analysis of feature sets including a source word feature set associated with a source word of a source phrase and a target word feature set associated with a target word of a target phrase, the program instructions, the program instructions executable by a computing device to effect:

appreciation of a text phrase;
determination that a similarity of the text phrase to the source phrase is greater than a threshold; and
application of the one or more phrase transformation rules to the text phrase to generate a transformed text phrase In the context of the present specification, unless expressly provided otherwise, a "computing device" comprises any hardware and/or software appropriate to the relevant task at hand. Thus, some non-limiting examples of computing devices include computer processors, computer systems (one or more servers, desktops, laptops, netbooks, etc.), smartphones, and tablets, as well as network equipment such as routers, switches, and gateways.

In the context of the present specification, unless expressly provided otherwise, a first device should be understood to be "in communication with" a second device if each of the devices is capable of sending information to and receiving information from the other device, across any physical medium or combinations of physical media, at any distance, and at any speed. As a non-limiting example, two digital electronic device(s) may communicate over a computer network such as the Internet. As another non-limiting example, the devices may run on the same digital electronic hardware, in which case communication may occur by any means available on such digital electronic hardware, such as inter-process communication.

In the context of the present specification, unless expressly provided otherwise, the expression "computer-readable medium" is intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular filesystem, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, event type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, examples of modifications to the present technology may also be set forth. This is done merely as an aid to understanding, and not to define the scope or bounds of the present technology. These modifications are not exhaustive, and a person skilled in the art may make other modifications while nonetheless remaining within the scope of the present technology. Further, where no example modifications of an element have been described, it should not be interpreted that no modifications to that element are possible, nor should it be interpreted that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 1:
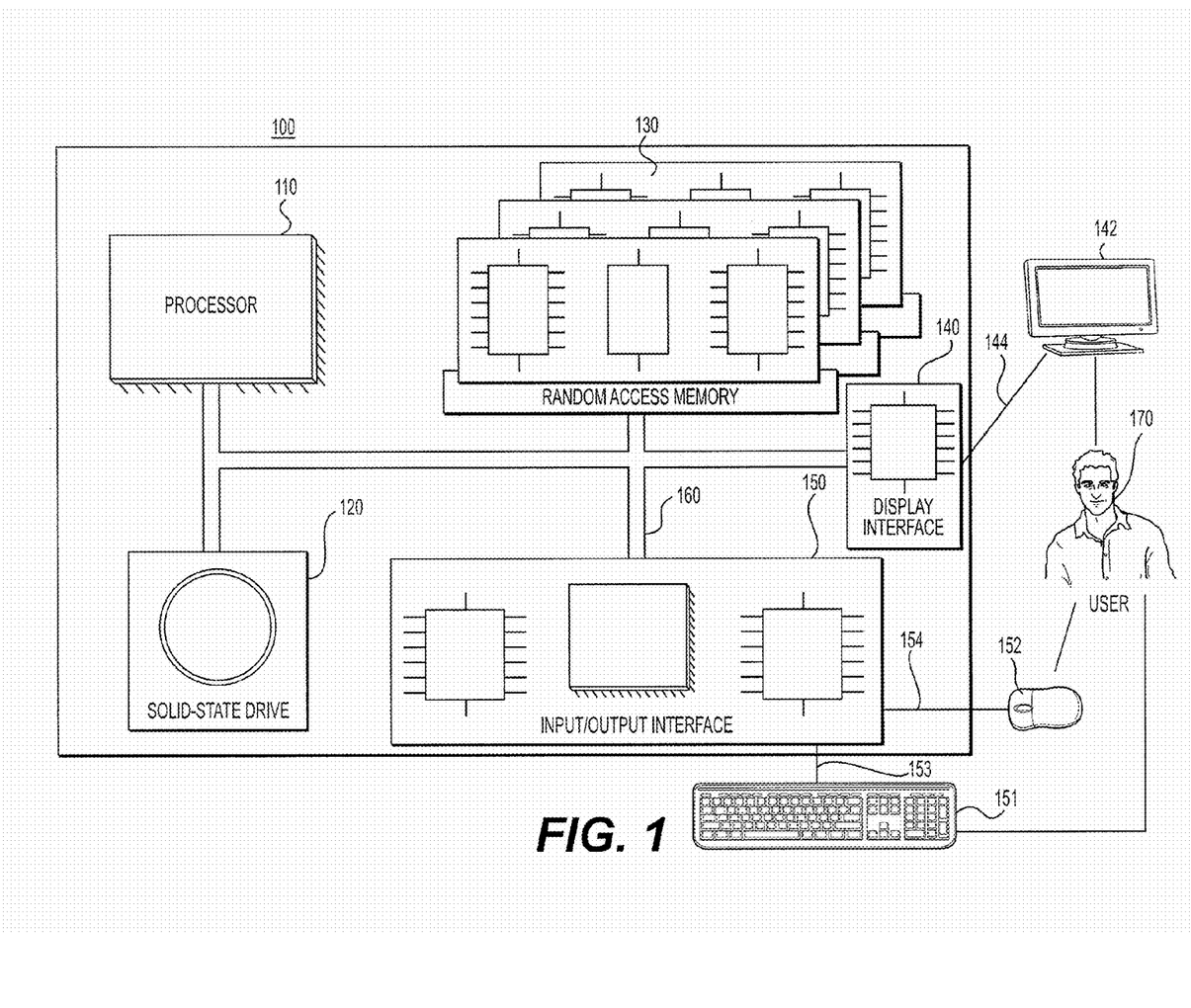
FIG. 1 is a diagram of a computer system suitable for implementing the present technology and/or being used in conjunction with implementations of the present technology.

Referring to FIG. 1, there is shown a computer system 100 suitable for use with some implementations of the present technology, the computer system 100 comprising various hardware components including one or more single or multi-core processors collectively represented by processor 110, a solid-state drive 120, a random access memory 130, a display interface 140, and an input/output interface 150. Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The display interface 140 may be coupled to a monitor 142 (e.g. via an HDMI cable 144) visible to a user 170, and the input/output interface 150 may be coupled to a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 for text processing. For example, the program instructions may be part of a library or an application.

Figure 2:
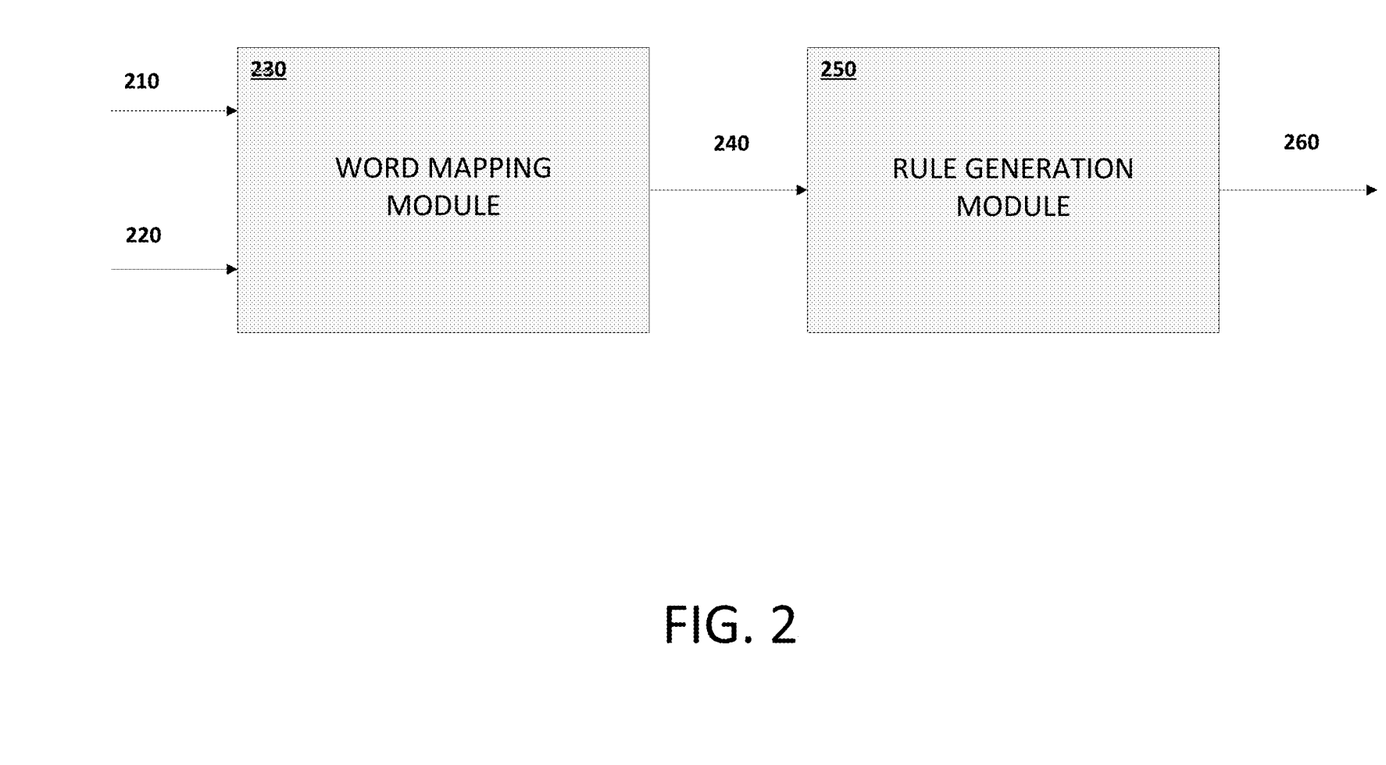
FIG. 2 is a block diagram of an exemplary implementation of the present technology.

FIG. 2 shows a block diagram of an exemplary implementation of the present technology comprising a word mapping module 230 and a rule generation module 250. The word mapping module takes a source phrase 210 and a target phrase 220 as inputs and determines a mapping 240 from source words of the source phrase 210 to target words of the target phrase 220. The rule generation module takes the mapping 240 as input and generates one or more phrase transformation rules 260 as output.

Figure 3A:
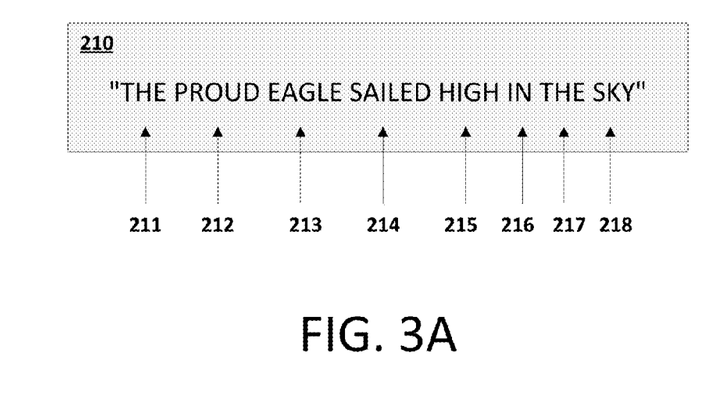
FIGS. 3A and 3B are diagrams representing a source phrase and a target phrase for use with an exemplary implementation of the present technology.
Figure 3B:
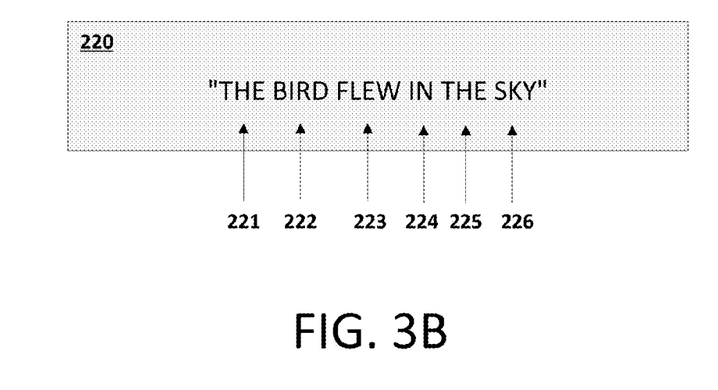

FIG. 3A shows an example of a source phrase 210, "The proud eagle sailed high in the sky," which is comprised of source words 211 to 218. FIG. 3B shows an example of a target phrase 220, "The bird flew in the sky," comprised of target word 221 to 226.

Figure 4A:
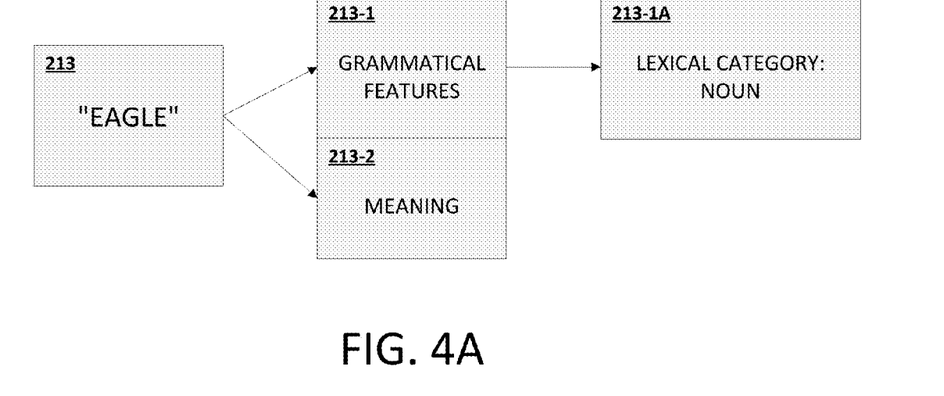
FIGS. 4A to 4D are diagrams representing various words and features sets associated with those words according to an exemplary implementation of the present technology.
Figure 4B:
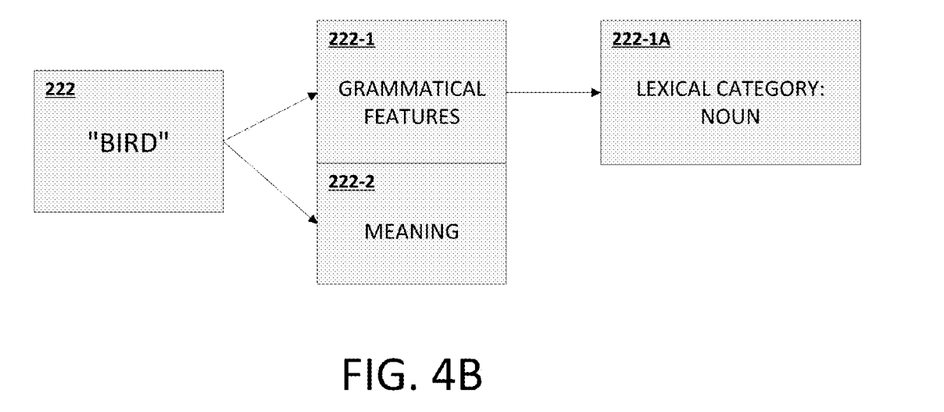

FIG. 4A shows a source word feature set in respect of the source word 213, "eagle," from the source phrase 210, the source word feature set including grammatical features 213-1 and a meaning 213-2 of the source word 213. The grammatical features 213-1 include a lexical category 213-1A of the source word 213, with a value of "noun" in this instance. The meaning 213-2 comprises one or more values encoding semantic properties of the source word 213, such as a word vector generated by the well-known word2vec algorithm. Similarly, FIG. 4B shows a target word feature set in respect of the target word 222, "bird," of the target phrase 220, the target word feature set including grammatical features 222-1 and a meaning 222-2 of the target word 222. The grammatical features 222-1 include a lexical category 222-1A of the source word 222, also having a value of "noun." The meaning 222-2 comprises one or more values encoding semantic properties of the source word 222, such as a word vector generated by the well-known word2vec algorithm. In some implementations wherein the meaning 213-2 of the source word 213 and the meaning 222-2 of the target word 222 are represented as vectors, a distance between those vectors may be measured so as to determine a semantic similarity between the source word 213 and the target word 222.

Figure 4C:
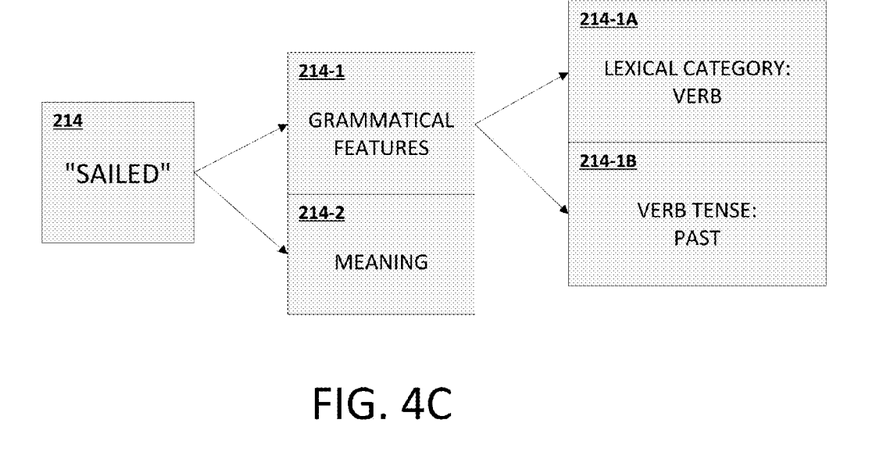
Figure 4D:
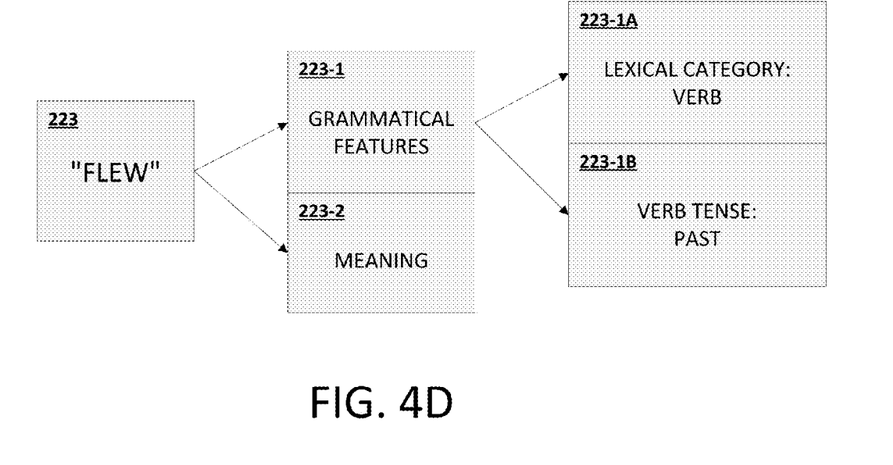

Similarly, FIG. 4C shows a source word feature set in respect of the source word 214, "sailed," from the source phrase 210, the source word feature set including grammatical features 214-1 and a meaning 214-2 of the source word 214. The grammatical features 214-1 include a lexical category 214-1A of the source word 214 (with a value of "verb") and a verb tense 214-1B (with a value of "past"). As above, the meaning 214-2 comprises one or more values encoding semantic properties of the source word 214. FIG. 4D shows a target word feature set in respect of the target word 223, "flew," of the target phrase 220, the target word feature set including grammatical features 223-1 and a meaning 223-2 of the target word 223. The grammatical features 223-1 include a lexical category 223-1A of the source word 223 (with a value of "verb") and a verb tense 223-1B (with a value of "past"). As described above, in some implementations, the meanings 214-2 and 223-2 are represented as vectors and a distance between them may be measured to determine a semantic similarity between the source word 214 and the target word 223.

Figure 5:
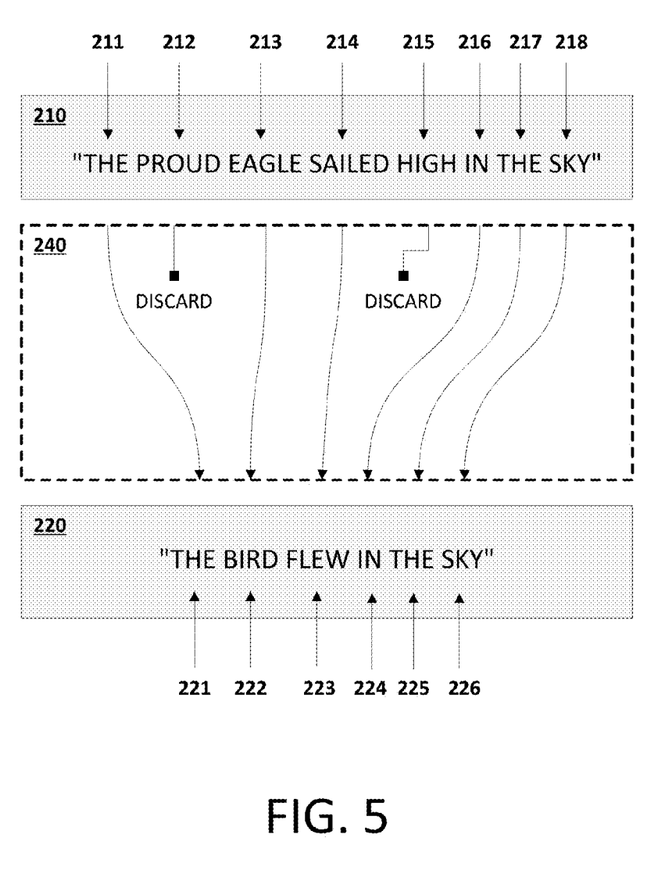
FIG. 5 is a diagram representing a mapping from a source phrase to a target phrase according to an exemplary implementation of the present technology.

In FIG. 5, there is shown a mapping 240 from the source words 211 to 218 of the source phrase 210 to the target words 221 to 226 of the target phrase 220. The source word 211 ("the") maps to the target word 221 ("the"), the source word 213 ("eagle") maps to the target word 222 ("bird"), the source word 214 ("sailed") maps to the target word 223 ("flew"), the source word 216 ("in") maps to the target word 224 ("in"), the source word 217 ("the") maps to the target word 225 ("the"), and the source word 218 ("sky") maps to the target word 226 ("sky"). Notably, neither the source word 212 ("proud") nor the source word 215 ("high") maps to any of the target words 221 to 226. Instead, the mapping 240 indicates that these source words 212 and 216 are to be discarded. The result is that the target phrase 220 has only six words, two less than the eight words of the source phrase 210.

Conversely, in other implementations (not shown), the mapping 240 may indicate that target words are to be added to the source phrase 210 to generate the target phrase 220. This would be true, for example, in the case described above in the background, wherein the source phrase "The Tate Modern opened in 2000" is mapped to the target phrase "The Tate Modern opened in the year two thousand," with the words "the year" being added to the source phrase to generate the target phrase.

Figure 6:
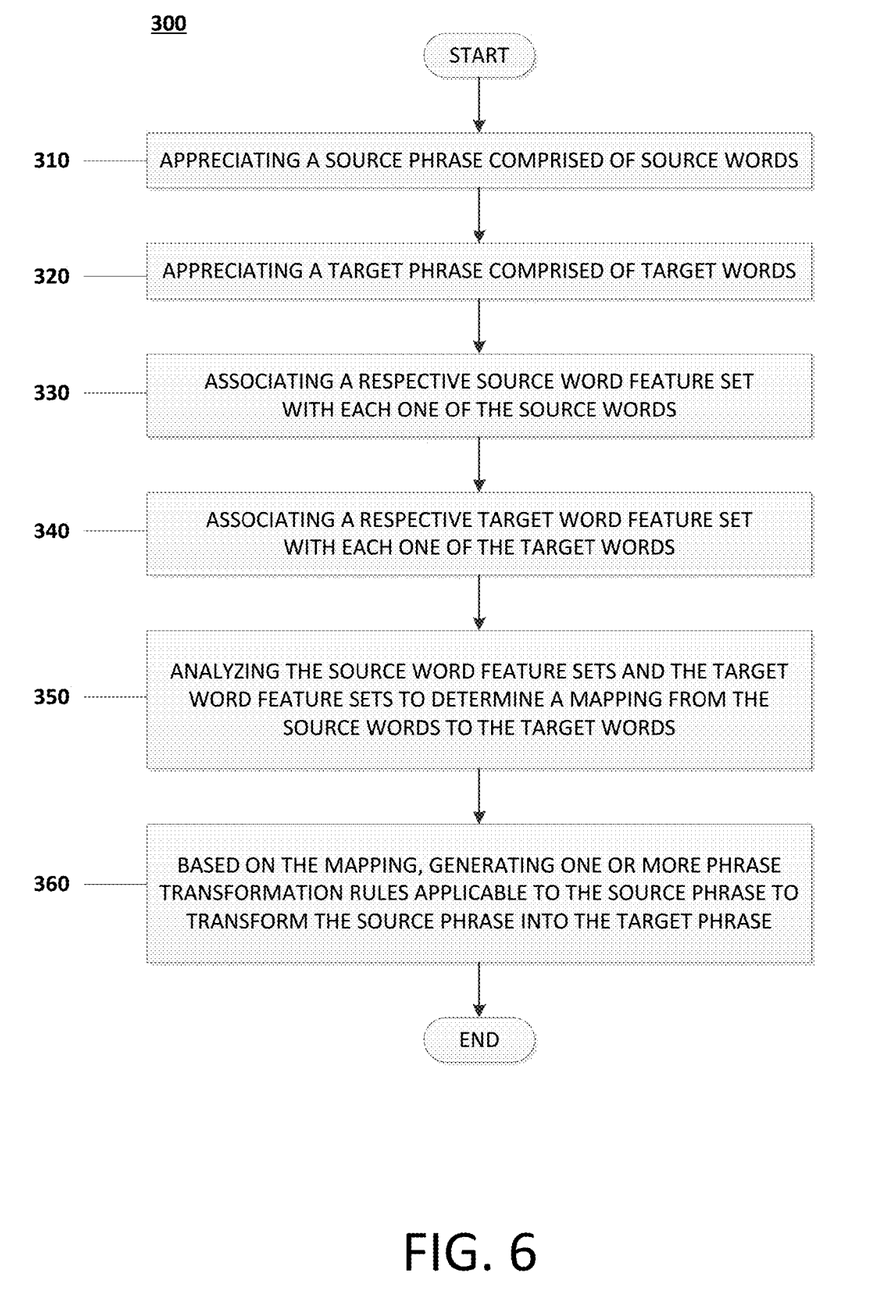
FIG. 6 is a flowchart illustrating the steps of a method implementation of the present technology.

FIG. 6 shows a flowchart illustrating the steps of an exemplary method 300 implementing the present technology. The method 300 may be carried out, for example, by the processor 110 of the computer system 100 shown in FIG. 1.

At step 310, a source phrase 210 comprised of source words 211 to 218 is appreciated. As non-limiting examples, the source phrase 210 may be received from the user 170 of FIG. 1, who may type the source phrase 210 using the keyboard 151, or the source phrase 210 may be received via a network interface of the computer system 100 (not depicted).

At step 320, a target phrase 220 comprised of target words 221 to 226 is appreciated. As non-limiting examples, the target phrase 220 may again be received from the user 170 via the keyboard 151 or via a network interface of the computer system 100 (not depicted).

At step 330, a respective source word feature set is associated with each one of the source words 211 to 218. The source word feature set with which each one of the source words 211 to 218 may include one or more grammatical features (e.g. 213-1 of FIG. 4A) of that source word, a meaning (e.g. 213-2 of FIG. 4A) of that source word, and/or one or more other features (not depicted) of that source word.

Step 330 may include determining the grammatical features of the source words 211 to 218 via a grammatical analysis of the source words 211 to 218, which may further include an analysis of the context within which the source words 211 to 218 are employed (i.e. the source phrase 210 itself and, optionally, any further contextual text appearing before and/or after the source phrase 210 in a larger text, such as a document).

Step 330 may include determining the meanings of the source words 211 to 218 via a semantic analysis of the source words 211 to 218 (e.g. via a known algorithm such as word2vec).

At step 340, a respective target word feature set is associated with each one of the target words 221 to 226. The target word feature set with which each one of the target words 221 to 226 may include one or more grammatical features (e.g. 222-1 of FIG. 4B) of that target word, a meaning (e.g. 222-2 of FIG. 4B) of that target word, and/or one or more other features (not depicted) of that target word.

Step 340 may include determining the grammatical features of the target words 221 to 226 via a grammatical analysis of the target words 221 to 226, which may further include an analysis of the context within which the target words 221 to 226 are employed (i.e. the target phrase 210 itself and, optionally, any further contextual text appearing before and/or after the target phrase 210 in a larger text, such as a document).

Step 340 may include determining the meanings of the target words 221 to 226 via a semantic analysis of the target words 221 to 226 (e.g. via a known algorithm such as word2vec).

At step 350, the source word feature sets and the target word features sets are analyzed to determine a mapping 240 from the source words (e.g. 211 to 218) of the source phrase 210 to the target words (e.g. 221 to 228) of the target phrase 220. This may include determining a similarity of each one of the source word feature sets to each one of the target word feature sets. In implementations wherein the source word feature sets associated with the one or more of the source words (e.g. 211 to 218) include grammatical features of the source words, determining the similarity of the source word feature sets to the target word feature sets may include comparing the respective grammatical features of each one of the source words to the respective grammatical features of each one of the target words. In implementations wherein the source word feature sets associated with the one or more of the source words (e.g. 211 to 218) include meanings of the source words, determining the similarity of the source word feature sets to the target word feature sets may include determining a similarity of the respective meaning of each one of the source words to the respective meaning of each one of the target words.

Step 350 may comprise selecting a most similar one of the target word feature sets associated with the target words (e.g. 221 to 226) of the target phrase 220 to one of the source word feature sets associated with a source word (e.g. one of 211 to 218) of the source phrase 210. The most similar one of the target word feature sets may be one having the most similar grammatical features to those of the source word feature set, one having the most similar meaning to that of the source word feature set, one having a most similar other feature to that of the source word feature set, or one having a highest weighted average similarity of various features to those of the source word feature set.

At step 360, one or more phrase transformation rules 260 applicable to the source phrase 210 to transform the source phrase 210 into the target phrase 220 are generated based on the mapping 240. For example, the mapping 240 depicted in FIG. 5 may be analyzed to determine that, because the source word 212 ("proud") does not map to any of the target words 221 to 226, a phrase transformation rule for deleting the second word (e.g. 212) of the source phrase 210 should be generated. In other cases, such as the "Tate Modern" example, a phrase transformation rule for adding one or more words (e.g. "the year") may be generated.

In other cases (not depicted), one or more of the phrase transformation rules 260 generated may be applicable to transform a source word associated with the one of the source word feature sets into a target word associated with the most similar one of the target word feature sets. In some such cases, the source word and the target word into which the source word is to be transformed share a same root, and the phrase transformation rule merely changes a form of the source word to a form of the target word. For example, the verb tense of a source word "flying" may be changed to the verb tense of a target word "flew". In some languages, such as Russian, nouns undergo transformations of form depending on the context within which they are employed (e.g. depending whether the noun is the subject or the object of an action). Phrase transformation rules 260 which modify the forms of source words to those of target words may therefore be useful for making structural changes to the source phrase 210 in order to transform it into the target phrase 220.

In some implementations, once the one or more phrase transformation rules 260 have been generated, they may be applied to a text phrase, which may or may not be identical to the source phrase 210 based on which the one or more phrase transformation rules 260 were generated. Various further implementations of the method 300 may therefore include steps of appreciating a text phrase (e.g. receiving a text phrase from the user 170 via the keyboard 151 or via a network interface of the computer system 100) and then applying the one or more phrase transformation rules 160 to the text phrase to generate a transformed text phrase.

In such implementations wherein the text phrase is not identical to the source phrase 210, the method 300 may further comprise determining that a similarity of the text phrase to the source phrase is greater than a threshold. For example, based on a semantic analysis, the phrase "The Tate Modern was opened to the public in 2000" may be deemed sufficiently similar to the source phrase "The Tate Modern opened in 2000" to apply the phrase transformation rule for adding "the year" before "2000" so as to generate the transformed text phrase "The Tate Modern was opened to the public in the year 2000."

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for text processing, the method being executable at a computing device, the method comprising:
at a training phase:
acquiring one or more source phrases, each of the source phrase comprising a first set of sequential words, each word of the first set of sequential words being a source word;
acquiring one or more target phrases, each of the target phrase being in a same language as the source phrases, each of the target phrase comprising a second set of sequential words being at least partially different from the first set of sequential words of a respective source phrase, each word of the second set of sequential words being a target word;
associating, for a given source phrase, a respective source word feature set with each one of the source words, the respective source word feature set for a given source word comprising:
one or more grammatical features of the given source word; and
a meaning of the given source word;
associating, for a respective target phrase, a respective target word feature set with each one of the target words, the respective target word feature set for a given target word comprising:
one or more grammatical features of the given target word; and
a meaning of the given target word;
analyzing the respective source word feature set of each source words of the given source phrase and the respective target word feature set of each target words of the respective target phrase;
mapping the given source word of the given source phrase to a corresponding target word of the respective target phrase based on a similarity of the source word feature set of the given source word to the target word feature set of the corresponding target word;
based on the mapping, generating one or more phrase transformation rules applicable to the given source phrase to transform the first set of sequential words into the second set of sequential words of the respective target phrase;
storing the one or more source phrases and the associated one or more generated phrase transformation rules in a memory of the computing device;
at an in-use phase:
acquiring a text phrase, the text phrase comprising a third set of sequential words being at least partially different from the first set of sequential words; and
retrieving the one or more source phrases from the memory;
performing at least one of a grammatical analysis and a semantic analysis of the text phrase and the one or more stored source phrases, to determine similarity of the text phrase to the one or more stored source phrases;
upon determining that the text phrase has the similarity to the given stored source phrase greater than a threshold, applying the associated one or more phrase transformation rules to the text phrase to generate a transformed text phrase, the transformed text phrase comprising a fourth set of sequential words being at least partially similar to the second set of sequential words of the respective target phrase.

2. The method of claim 1, wherein:
determining the similarity of each one of the source word feature sets to each one of the target word feature sets comprises comparing the respective grammatical features of each one of the source words to the respective grammatical features of each one of the target words;
determining the similarity of each one of the source word feature sets to each one of the target word feature sets comprises determining a similarity of the respective meaning of each one of the source words to the respective meaning of each one of the target words.

3. The method of claim 1, wherein:
analyzing the source word feature sets and the target word feature sets to determine a mapping from the source words to the target words further comprises selecting a most similar one of the target word feature sets to one of the source word feature sets; and
generating the one or more phrase transformation rules applicable to the given source phrase to transform the given source phrase into the respective target phrase comprises generating a first phrase transformation rule applicable to the given source phrase to transform a source word associated with the one of the source word feature sets into a target word associated with the most similar one of the target word feature sets.

4. The method of claim 3, wherein:
the source word associated with the one of the source word feature sets and the target word associated with the most similar one of the target word feature sets share a same root; and
the first phrase transformation rule is applicable to the given source phrase to modify a form of the source word to a form of the target word.

5. The method of claim 1, wherein generating the one or more phrase transformation rules applicable to the given source phrase to transform the given source phrase into the respective target phrase comprises generating a second phrase transformation rule applicable to the source phrase to delete at least one word from the given source phrase.

6. The method of claim 1, wherein generating the one or more phrase transformation rules applicable to the given source phrase to transform the given source phrase into the respective target phrase comprises generating a third phrase transformation rule applicable to the given source phrase to add at least one word to the given source phrase.

7. A method for text processing, the method being executable at a computing device comprising a memory, the memory storing one or more source phrases, and one or more phrase transformation rules associated with each of the one or more source phrases, the one or more phrase transformation rules having been generated based on an analysis of feature sets including (i) a source word feature set associated with each source word comprising a first set of sequential words forming a given source phrase, the source word feature set for a given source word comprising one or more grammatical features of the given source word, and a meaning of the given source word, and (ii) a target word feature set associated with each target word comprising a second set of sequential words forming a respective target phrase, the target word feature set for a given target word comprising one or more grammatical features of the given target word, and a meaning of the given target word, the target phrase being in a same language as the source phrase, the analysis comprising mapping the given source word to a corresponding target word based on a similarity of the source word feature set of the given source word to the target word feature set of the corresponding target word, the method comprising:

acquiring a text phrase, the text phrase comprising a third set of sequential words being at least partially different from the first set of sequential words;

retrieving the one or more source phrases;

performing at least one of a grammatical analysis and a semantic analysis of the text phrase and the one or more stored source phrases to determine similarity of the text phrase to the one or more stored source phrases;

upon determining that the similarity of the text phrase to the given source phrase is greater than a threshold applying the associated one or more phrase transformation rules to the text phrase to generate a transformed text phrase, the transformed text phrase being at least partially similar to the second set of sequential words of the respective target phrase.

8. A non-transitory computer-readable medium storing program instructions for text processing, the program instructions being executable by a computing device to effect:

at a training phase:

acquisition of one or more source phrases, each of the source phrase comprising a first set of sequential words, each word of the first set of sequential words being a source word;

acquisition of one or more target phrases, each of the target phrase being in a same language as the source phrases, each of the target phrase comprising of a second set of sequential words being at least partially different from the first set of sequential words of a respective source phrase, each word of the second set of sequential words being a target word;

association, for a given source phrase, of a respective source word feature set with each one of the source words, the respective source word feature set for a given source word comprising:
one or more grammatical features of the given source word; and
a meaning of the given source word;

association, for a respective target phrase, of a respective target word feature set with each one of the target words, the respective source word feature set for a given target word comprising:
one or more grammatical features of the given target word; and
a meaning of the given target word;

analysis of the respective source word feature set of each source words of the given source phrase and the respective target word feature set of each target words of the respective target phrase;

map the given source word of the given source phrase to a corresponding target word of the respective target phrase based on a similarity of the source word feature set of the given source word to the target word feature set of the corresponding target word;

based on the mapping, generation of one or more phrase transformation rules applicable to the given source phrase to transform the first set of sequential words into the second set of sequential words of the respective target phrase;

storing the one or more source phrases and the associated one or more generated phrase transformation rules in a memory of the computing device;

at an in-use phase:

acquisition of a text phrase, the text phrase comprising a third set of sequential words being at least partially different from the first set of sequential words;

retrieving the one or more source phrases from the memory;

perform at least one of a grammatical analysis and a semantic analysis of the text phrase and the one or more stored source phrases to determine similarity of the text phrase to the one or more stored source phrases;

upon determining that the text phrase has the similarity to the given source phrase greater than a threshold, applying the associated one or more phrase transformation rules to the text phrase to generate a transformed text phrase, the transformed text phrase comprising a fourth set of sequential words being at least partially similar to the second set of sequential words of the respective target phrase.

9. The medium of claim 8, wherein:

determination of the similarity of each one of the source word feature sets to each one of the target word feature sets comprises comparison of the respective grammatical features of each one of the source words to the respective grammatical features of each one of the target words; and determination of the similarity of each one of the source word feature sets to each one of the target word feature sets comprises determination of a similarity of the respective meaning of each one of the source words to the respective meaning of each one of the target words.

10. The medium of claim 9, wherein generation of the one or more phrase transformation rules applicable to the given source phrase to transform the given source phrase into the respective target phrase comprises generation of a second phrase transformation rule applicable to the source phrase to delete at least one word from the given source phrase.

11. The medium of claim 9, wherein generation of the one or more phrase transformation rules applicable to the given source phrase to transform the given source phrase into the respective target phrase comprises generation of a third phrase transformation rule applicable to the source phrase to add at least one word to the given source phrase.

12. The medium of claim 8, wherein:

analysis of the source word feature sets and the target word feature sets to determine a mapping from the source words to the target words further comprises selection of a most similar one of the target word feature sets to one of the source word feature sets; and generation of the one or more phrase transformation rules applicable to the given source phrase to transform the given source phrase into the respective target phrase comprises generation of a first phrase transformation rule applicable to the given source phrase to transform a source word associated with the one of the source word feature sets into a target word associated with the most similar one of the target word feature sets.

13. The medium of claim 12, wherein:

the source word associated with the one of the source word feature sets and the target word associated with the most similar one of the target word feature sets share a same root; and the first phrase transformation rule is applicable to the given source phrase to modify a form of the source word to a form of the target word.

14. A non-transitory computer-readable medium storing one or more source phrases, and one or more phrase transformation rules associated with each of the one or more source phrases, and program instructions, the one or more phrase transformation rules having been generated based on an analysis of feature sets including (i) a source word feature set associated with each source word comprising a first set of sequential words forming a given source phrase, the source word feature for a given source word comprising one or more grammatical features of the given source word and a meaning of the given source word, and (ii) a target word feature set associated with each target word comprising a second set of sequential words forming a respective target phrase, the target word feature for a given target word comprising one or more grammatical features of the given target word and a meaning of the given target word, the target phrase being in a same language as the source phrase, the analysis comprising mapping the given source word to a corresponding target word based on a similarity of the source word feature set of the given source word to the target word feature set of the corresponding target word, the program instructions executable by a computing device to effect:

acquisition of a text phrase, the text phrase comprising a third set of sequential words being at least partially different from the first set of sequential words;

retrieve the one or more source phrases;

perform at least one of a grammatical analysis and a semantic analysis of the text phrase and the one or more stored source phrases to determine similarity of the text phrase to the one or more stored source phrases;

upon determination that the similarity of the text phrase to the given source phrase is greater than a threshold, applying of the associated one or more phrase transformation rules to the text phrase to generate a transformed text phrase, the transformed text phrase being at least partially similar to the second set of sequential words of the respective target phrase.

* * * * *